US012539582B2

(12) United States Patent
Mochizuki

(10) Patent No.: US 12,539,582 B2
(45) Date of Patent: Feb. 3, 2026

(54) DRIVING TOOL

(71) Applicant: Max Co., Ltd., Tokyo (JP)

(72) Inventor: Kazuya Mochizuki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 19/065,586

(22) Filed: Feb. 27, 2025

(65) Prior Publication Data

US 2025/0269500 A1 Aug. 28, 2025

(30) Foreign Application Priority Data

Feb. 28, 2024 (JP) ................................ 2024-027977

(51) Int. Cl.

*B25B 23/00* (2006.01)
*B25B 21/00* (2006.01)
*B25B 23/06* (2006.01)
*B25C 1/04* (2006.01)

(52) U.S. Cl.

CPC .............. *B25B 21/00* (2013.01); *B25B 23/06* (2013.01); *B25C 1/043* (2013.01)

(58) Field of Classification Search

CPC ....... B25B 21/00; B25B 23/06; B25B 21/023; B25B 23/0064; B25C 1/083; B25C 1/047; B25C 1/008; B25C 1/06; B25C 1/04; B25C 1/041; B25C 1/001

USPC ........ 173/171, 11, 93.5, 1, 109, 13, 15, 159, 173/176, 177; 227/130, 8, 136, 2, 81

See application file for complete search history.

(56) References Cited

U.S. PATENT DOCUMENTS

2005/0072585 A1* 4/2005 Kamo ..................... B25C 1/043 173/4
2017/0057069 A1* 3/2017 Sekiguchi ............... B25C 1/042

FOREIGN PATENT DOCUMENTS

JP 2014-124713 A 7/2014
JP 2021-053745 A 4/2021

OTHER PUBLICATIONS

Jul. 2, 2025—(EP) Extended Search Report—App 25160709.9.

* cited by examiner

*Primary Examiner* — Jacob A Smith
(74) *Attorney, Agent, or Firm* — Banner & Witcoff, Ltd.

(57) ABSTRACT

There is provided a driving tool driven by air pressure of compressed air. The driving tool includes: a driving cylinder to which compressed air is supplied; a driving piston configured to move in an up-down direction inside the driving cylinder by the supplied compressed air; a driver attached to the driving piston and configured to move in the up-down direction; and a guide portion provided on a lower side of the driving cylinder. The guide portion has a guide hole through which the driver passes and an exhaust hole that allows an inside of the driving cylinder to communicate with an outside of the driving tool. The exhaust hole is provided at a position separated outward from an inner peripheral surface of the guide hole.

8 Claims, 9 Drawing Sheets

DRIVING TOOL

CROSS-REFERENCE TO RELATED APPLICATIONS

This application is based on and claims priority under 35 USC 119 from Japanese Patent Application No. 2024-027977 filed on Feb. 28, 2024, the contents of which are incorporated herein by reference.

TECHNICAL FIELD

The present disclosure relates to a driving tool for driving a fastener to a driven member.

BACKGROUND ART

A driving tool is a tool for driving a fastener into a driven member by causing a driving cylinder to operate using compressed air as a power source and moving a driver in an axial direction. As such a driving tool, a screw driving machine is known in which a screw as an example of a fastener is driven into a driven member and then tightened (for example, see JP2021-053745A). In addition, for example, JP2021-053745A also describes a nail driving machine that drives a nail as an example of a fastener into a driven member.

In the driving tool such as a screw driving machine or a nail driving machine, when the compressed air is supplied to the driving cylinder, air pressure of the compressed air is applied to an upper surface of a driving piston, so that the driving piston moves in a downward direction. Accordingly, in the driving tool, the driving piston moves the driver in the downward direction by the air pressure of the compressed air supplied to the driving cylinder, and the fastener is driven into the driven member.

When the driving piston moves in the downward direction, the air in a driving cylinder lower chamber formed on a lower side of the driving piston is discharged to the outside through a gap between the driver and a shaft hole, an injection path, or the like through which the driver passes. However, if the air in the driving cylinder lower chamber is not appropriately discharged, the air pressure in the driving cylinder lower chamber increases, a load generated when the driving piston moves in the downward direction increases, and a speed at which the driving piston moves in the downward direction decreases.

Further, when the driving piston returns to a top dead center position by the air pressure of the compressed air supplied from a blowback chamber (return air chamber) to the driving cylinder lower chamber, if the air in the driving cylinder lower chamber is not appropriately discharged, the air pressure in the blowback chamber and the driving cylinder lower chamber may increase. In this case, a speed at which the driving piston moves in the upward direction becomes too high, and the driving piston colliding with a damper provided on an upper side of the driving cylinder may bounce, and the driving piston may not be able to return to the top dead center position.

A diameter of the shaft hole, the injection path, or the like through which the driver passes may be increased so that the air in the driving cylinder lower chamber can be discharged to the outside through a gap between an outer periphery of the driver and an inner periphery of the shaft hole, the injection path, or the like. However, in such a configuration, an interval between the driver and the shaft hole, the injection path, or the like is increased. The driving tool is configured such that the driver is guided by the shaft hole, the injection path, or the like when the driver moves. Therefore, in a case where the interval between the driver and the shaft hole, the injection path, or the like is increased, the inclination of the driver cannot be reduced when the driver is guided by the shaft hole, the injection path, or the like, and the guide performance of the driver by the shaft hole, the injection path, or the like is lowered.

By forming a portion protruding outward on a part of an inner peripheral surface of the shaft hole, the injection path, or the like, the air in the driving cylinder lower chamber can be discharged to the outside. However, when the uneven surface are formed on the inner peripheral surface of the shaft hole, the injection path, or the like, the inclination of the driver cannot be reduced when the driver is guided by the shaft hole, the injection path, or the like, and the guide performance of the driver by the shaft hole, the injection path, or the like is lowered.

Therefore, in order to control an appropriate air sequence, it is necessary to appropriately maintain air pressure in the driving cylinder. Further, it is also required to ensure the guide performance of the driver.

SUMMARY OF INVENTION

The present disclosure has been made to solve such a problem, and an object of the present disclosure is to provide a driving tool capable of appropriately maintaining air pressure in a driving cylinder and ensuring a guide performance of a driver.

According to an illustrative aspect of the present disclosure, a driving tool driven by air pressure of compressed air includes: a driving cylinder to which compressed air is supplied; a driving piston configured to move in an up-down direction inside the driving cylinder by the supplied compressed air; a driver attached to the driving piston and configured to move in the up-down direction; and a guide portion provided on a lower side of the driving cylinder. The guide portion has a guide hole through which the driver passes and an exhaust hole that allows an inside of the driving cylinder to communicate with an outside of the driving tool. The exhaust hole is provided at a position separated outward from an inner peripheral surface of the guide hole.

In the present disclosure, when the compressed air is supplied to the driving cylinder and the driving piston moves, the driver moves while being guided by the guide hole of the guide portion. Further, since a part of the air in the driving cylinder is discharged to the outside through the exhaust hole, the air pressure above and below the driving piston in the driving cylinder is appropriately maintained.

In the present disclosure, in the driving tool operated by the air pressure of the compressed air supplied to the driving cylinder, the air pressure in the driving cylinder can be appropriately maintained according to each operation. Further, since the exhaust hole is provided at a position separated outward from the inner peripheral surface of the guide hole, the function of guiding the driver by the guide hole is not hindered by the exhaust hole.

DESCRIPTION OF EMBODIMENTS

Hereinafter, embodiments of a screw driving machine as an example of a driving tool of the present invention will be described with reference to the drawings.

Figure 1A:
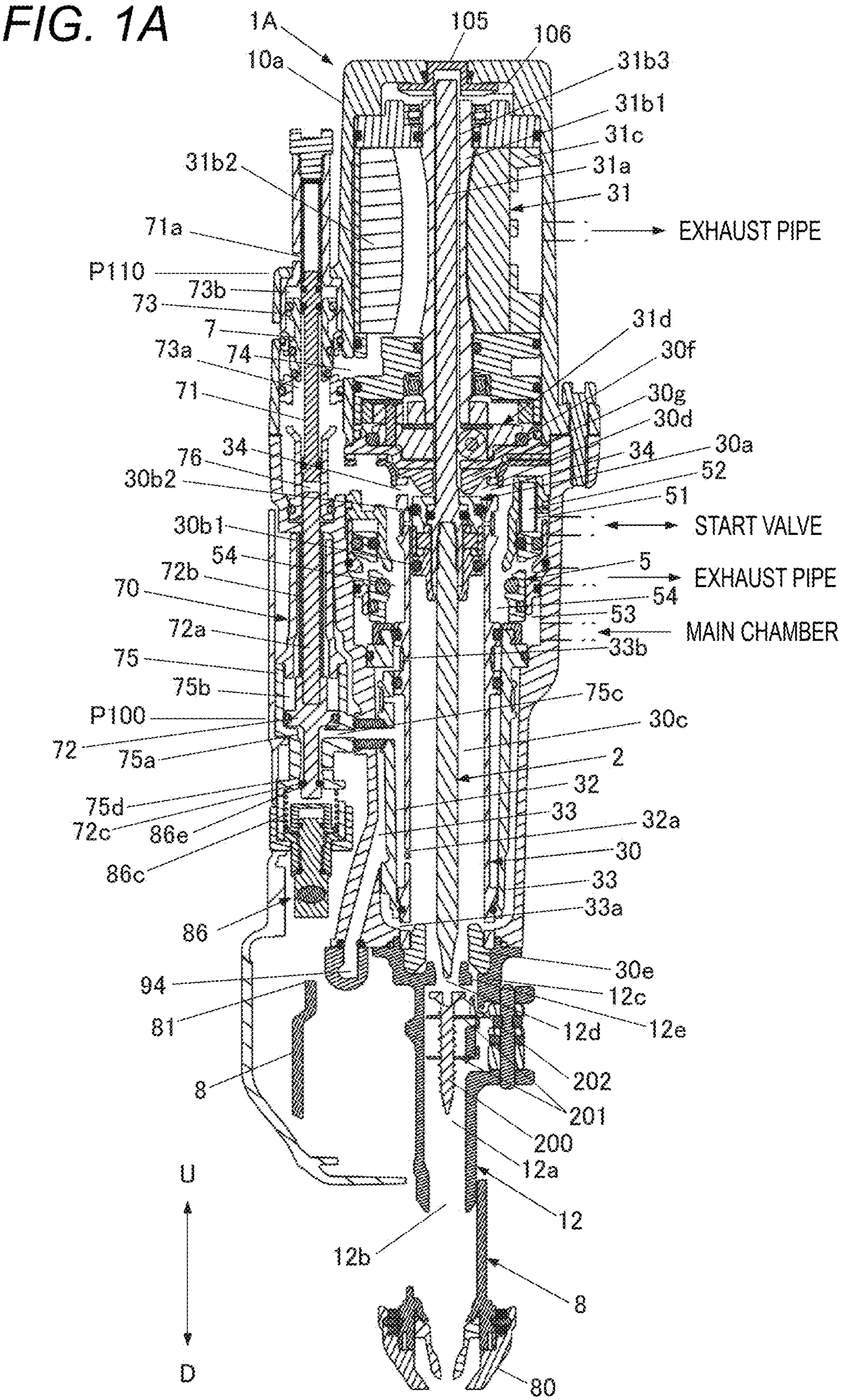
FIG. 1A is a front sectional view illustrating the example of a screw driving machine according to the present embodiment.
Figure 1B:
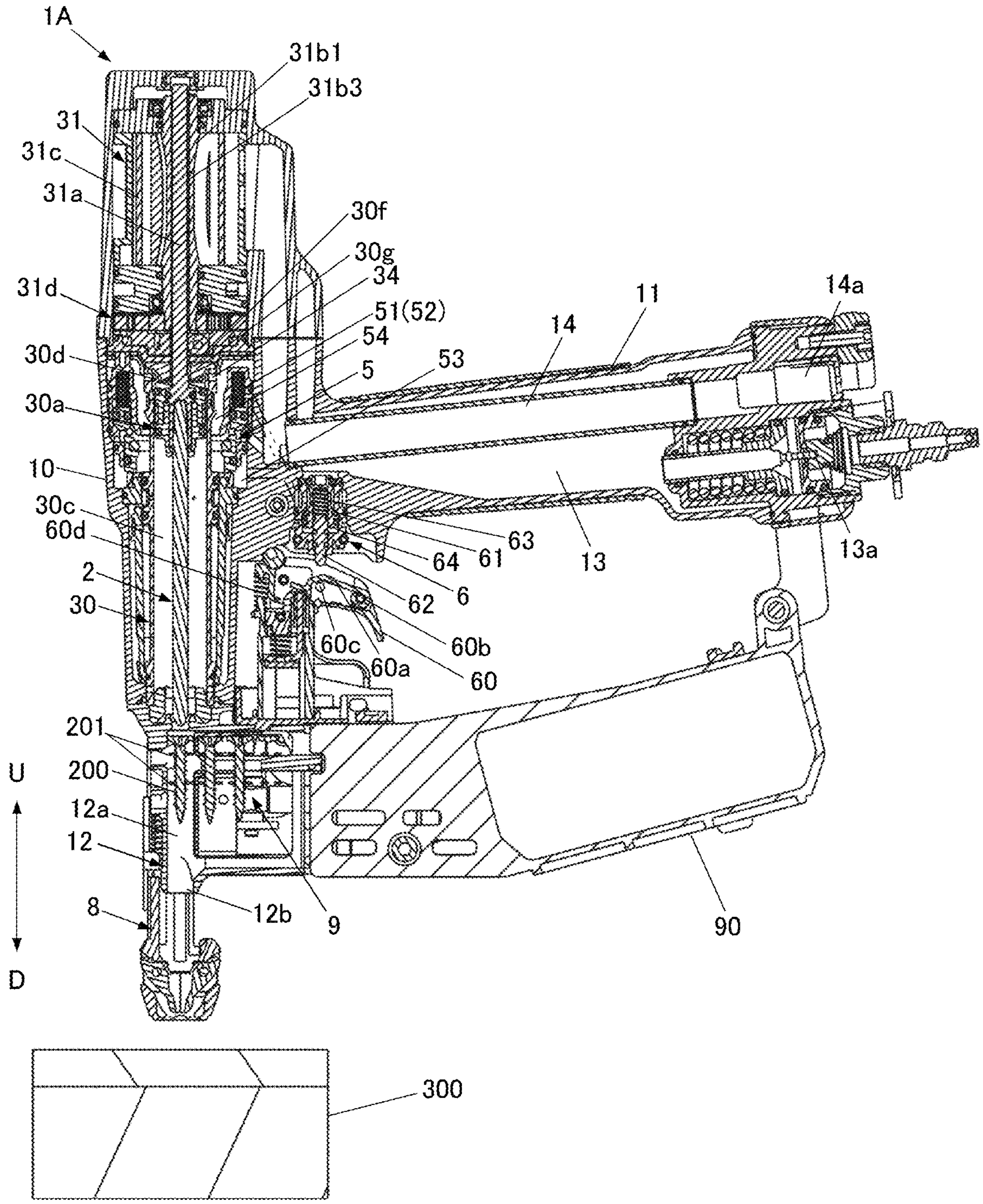
FIG. 1B is a side sectional view illustrating an example of the screw driving machine according to the present embodiment.
Figure 1C:
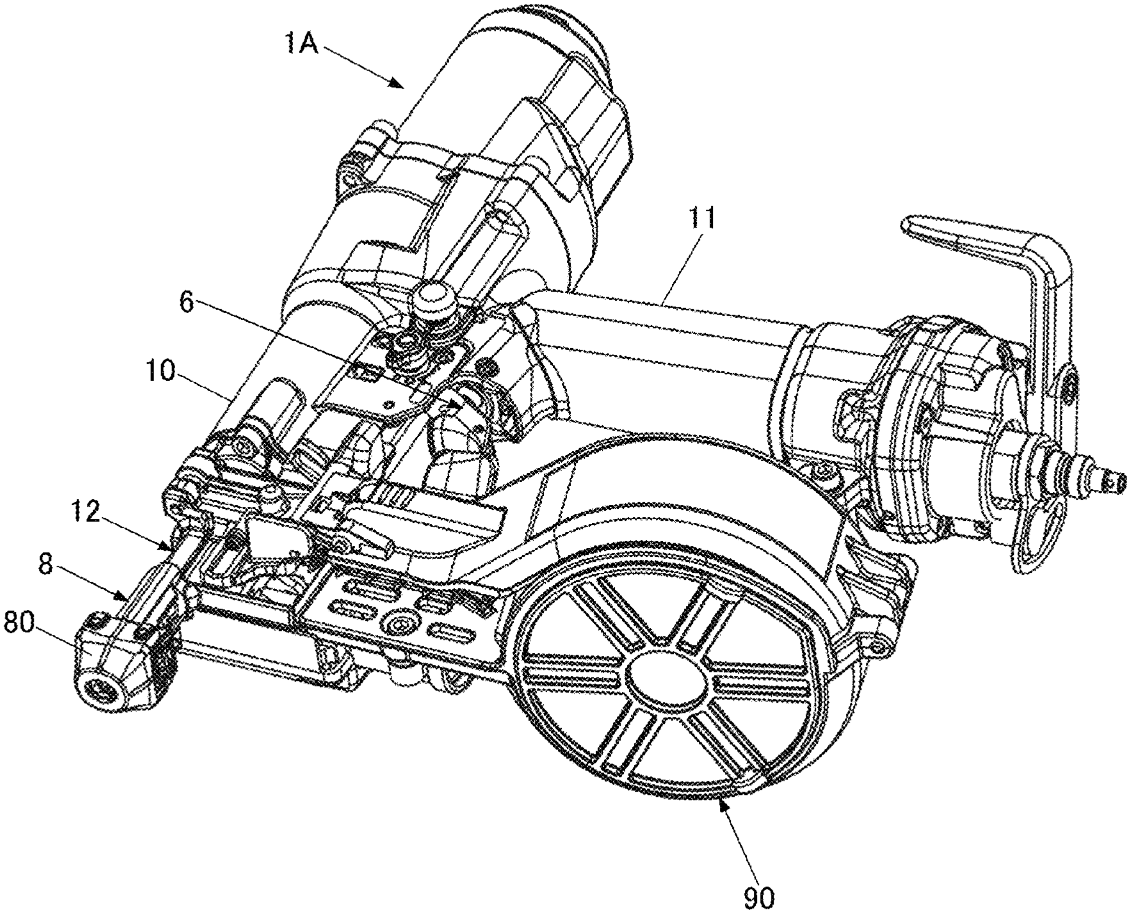
FIG. 1C is an external perspective view illustrating the example of the screw driving machine according to the present embodiment.
Figure 2:
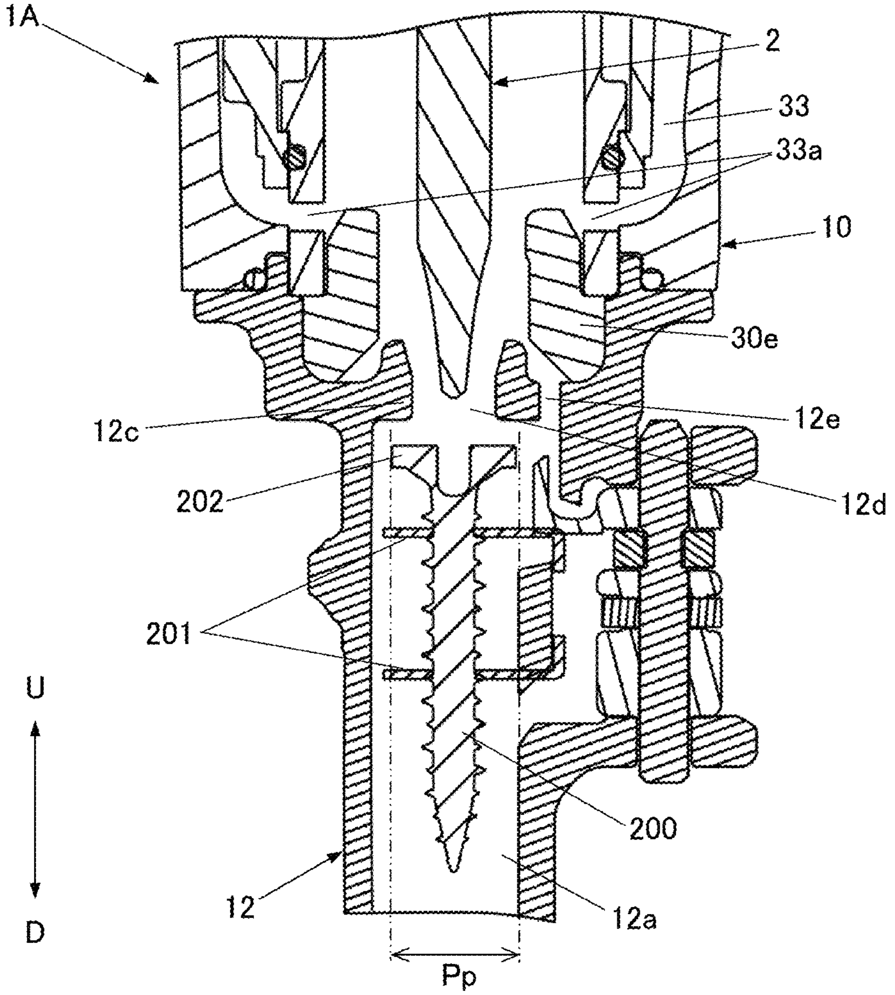
FIG. 2 is a front sectional view illustrating a configuration of main portions of the screw driving machine according to the present embodiment.
Figure 3:
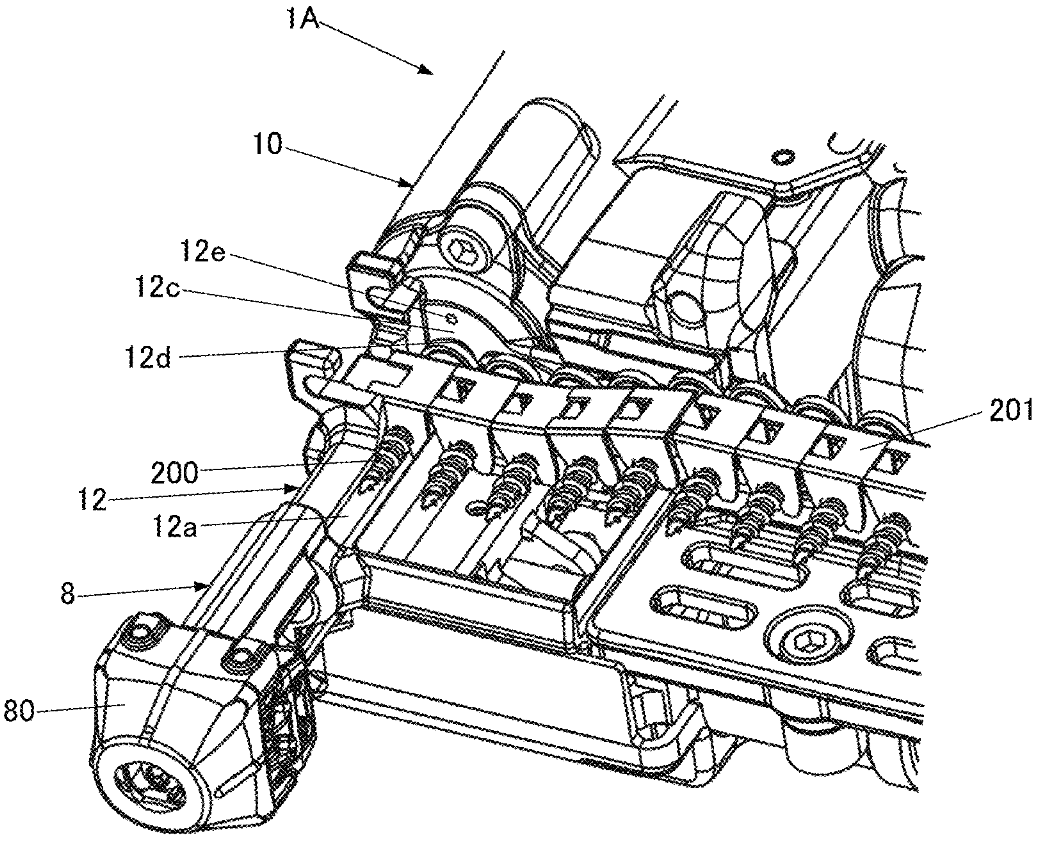
FIG. 3 is an exploded perspective view illustrating a configuration of main portions of the screw driving machine according to the present embodiment.

Configuration Example of Screw Driving Machine According to Present Embodiment FIG. 1A is a front sectional view illustrating an example of a screw driving machine according to the present embodiment, FIG. 1B is a side sectional view illustrating an example of the screw driving machine according to the present embodiment, and FIG. 1C is an external perspective view illustrating an example of the screw driving machine according to the present embodiment. FIG. 2 is a front sectional view illustrating a configuration of main parts of the screw driving machine according to the present embodiment, and FIG. 3 is an exploded perspective view illustrating a configuration of main parts of the screw driving machine according to the present embodiment.

A screw driving machine 1A causes a driver bit 2, which is an example of a driver, to move in an axial direction using air pressure of compressed air. Further, the screw driving machine 1A rotates the driver bit 2 around an axis using the air pressure of the compressed air. By moving the driver bit 2 in the axial direction, the screw driving machine 1A drives a screw 200 into a driven member 300 such that a head portion 202 of the screw 200 floats from the driven member 300. In addition, the screw driving machine 1A rotates the driver bit 2 around the axis to tighten the screw 200 driven into the driven member 300.

The screw driving machine 1A is used by being held by a hand of a person and includes a body 10 and a handle 11. The body 10 extends along an axial direction of the driver bit 2.

In the screw driving machine 1A, the handle 11 is provided in the vicinity of the middle along an extending direction of the body 10. The handle 11 extends in a direction intersecting the body 10. Further, in the screw driving machine 1A, the nose 12 is provided on one side along the extending direction of the body 10.

As illustrated in FIG. 1A and the like, the screw driving machine 1A is illustrated in a form in which the nose 12 faces downward, and thus one side along the extending direction of the body 10 is referred to as a lower side, and the other side along the extending direction of the body 10 is referred to as an upper side. In the screw driving machine 1A, a downward direction is indicated by an arrow D. In the screw driving machine 1A, an upward direction opposite to the downward direction is indicated by an arrow U. The driver bit 2 has an axial direction oriented along an up-down direction, and moves in the downward direction and the upward direction.

The nose 12 is an example of an injection path forming portion, and includes an injection passage 12*a* to which the screw 200 is supplied, an injection port 12*b* from which the screw 200 supplied to the injection passage 12*a* is injected, and a guide portion 12*c* that guides the driver bit 2.

The injection passage 12*a* extends along the up-down direction in which the driver bit 2 moves. The injection port 12*b* is formed to have an opening at a lower end along an extending direction of the injection passage 12*a*. The guide portion 12*c* includes a guide hole 12*d* through which the driver bit 2 passes. The guide hole 12*d* is formed to have an opening penetrating the guide portion 12*c* at an upper end along the extending direction of the injection passage 12*a*. The guide hole 12*d* is an opening provided in a movement path of the driver bit 2 and having a shape through which the driver bit 2 can pass. When a cross-sectional shape of the driver bit 2 is a circular shape, the guide hole 12*d* is a circular shape having a diameter large enough not to hinder the movement of the driver bit 2 in the up-down direction with respect to a diameter of the driver bit 2.

The screw driving machine 1A includes a driving cylinder 30 to which compressed air is supplied, a driving piston 30*a* that moves by the air pressure of the compressed air supplied to the driving cylinder 30, and a driver bit 2 that is attached to the driving piston 30*a* and moves in the axial direction.

The screw driving machine 1A includes an air motor 31 that rotates the driver bit 2 around an axis, and a motor shaft 31*a* that rotates by the air pressure of the compressed air supplied to the air motor 31.

The driving cylinder 30 is provided inside the body 10 and includes a cylindrical space extending in the up-down direction.

The driving cylinder 30 is internally provided with the driving piston 30*a*. The driving piston 30*a* has a circular plate shape, a cylindrical shape, or the like that can move inside the driving cylinder 30 along the up-down direction.

The driving piston 30*a* is attached such that the motor shaft 31*a* protrudes upward. The driving piston 30*a* is detachably attached via the motor shaft 31*a* such that the driver bit 2 protrudes downward.

In the screw driving machine 1A, the driving piston 30*a* moves in the up-down direction inside the driving cylinder 30, so that the driver bit 2 and the motor shaft 31*a* move in the arrow D direction and the arrow U direction along the axial direction of the driver bit 2. In the screw driving machine 1A, the driver bit 2 rotates around the axis of the driver bit 2 as the motor shaft 31*a* rotates.

In the screw driving machine 1A, when the compressed air is supplied to the driving cylinder 30, the air pressure of the compressed air is applied to an upper surface of the driving piston 30*a*, so that the driving piston 30*a* is moved in the downward direction as indicated by the arrow D.

Accordingly, in the screw driving machine 1A, the driving piston 30*a* moves the driver bit 2 in the downward direction indicated by the arrow D along the axial direction by the air pressure of the compressed air supplied to the driving cylinder 30, and the screw 200 is driven into the driven member. In the screw driving machine 1A, the motor shaft 31*a* rotates the driver bit 2 around the axis by the air pressure of the compressed air supplied to the air motor 31, and the screw 200 is tightened to the driven member.

A first seal portion 30*b*1 and a second seal portion 30*b*2 are attached to an outer periphery of the driving piston 30*a*. The first seal portion 30*b*1 and the second seal portion 30*b*2 are provided with a predetermined interval therebetween at two positions along a direction in which the driving piston 30*a* moves. The first seal portion 30*b*1 is provided on a lower side along the direction in which the driving piston 30*a* moves, and the second seal portion 30*b*2 is provided on an upper side along the direction in which the driving piston 30*a* moves. The first seal portion 30*b*1 and the second seal portion 30*b*2 protrude from the outer periphery of the driving piston 30*a* and come into contact with an inner peripheral surface of the driving cylinder 30. Further, the first seal portion 30*b*1 and the second seal portion 30*b*2 slide on the inner peripheral surface of the driving cylinder 30 when the driving piston 30*a* moves in the up-down direction.

Accordingly, the interior of the driving cylinder 30 is partitioned by the driving piston 30*a*, and the airtightness between a space on an upper side of the driving piston 30*a* and a space on a lower side of the driving piston 30*a* is maintained by the first seal portion 30*b*1 and the second seal portion 30*b*2.

In the driving cylinder 30, a first chamber 30*c* is formed on a low side of the driving piston 30*a*, and a second chamber 30*d* is formed above the driving piston 30*b*. The first chamber 30*c* is an example of a driving cylinder lower chamber, and includes a space from the low side of the driving piston 30*a* to the guide portion 12*c*. The second chamber 30*d* is an example of a driving cylinder upper chamber, and is a space on the upper side of the driving piston 30*a*.

The driving cylinder 30 includes a bumper 30*e* at a lower end of the first chamber 30*c*. The bumper 30*e* is formed of an elastic body and is attached to the guide portion 12*c*. The bumper 30*e* has an annular shape with which the driving piston 30*a* can come into contact. Further, in the bumper 30*e*, an opening in a central portion is connected to the guide hole 12*d*, and the driver bit 2 can pass through the opening in the central portion. The driving piston 30*a* is movable in the downward direction to a position in contact with the bumper 30*e*. In the driving piston 30*a* and the driver bit 2, a position where the driving piston 30*a* comes into contact with the bumper 30*e* is a bottom dead center position. The bumper 30*e* is elastically deformable, and the bottom dead center positions of the driving piston 30*a* and the driver bit 2 move within a range in which the bumper 30*e* is elastically deformable.

The screw driving machine 1A includes an exhaust hole 12*e* in the guide portion 12*c*. The exhaust hole 12*e* is formed to have an opening penetrating the guide portion 12*c* outside the guide hole 12*d*. The exhaust hole 12*e* is an opening that communicates with the outside of the screw driving machine 1A including the body 10, the nose 12, and the like and has a shape through which a predetermined amount of air can pass. The exhaust hole 12*e* communicates with an opening in a central portion of the bumper 30*e*. Accordingly, the first chamber 30*c* communicates with the outside of the screw driving machine 1A via the exhaust hole 12*e*.

Since the screw 200 supplied to the injection passage 12*a* is coupled by the coupling band 201, a radial position of the screw 200 in the injection passage 12*a* is substantially determined. The exhaust hole 12*e* is provided radially outside the screw 200 with respect to a supply position Pp of the screw 200 supplied to the injection passage 12*a*. A radial range of the supply position Pp in the screw 200 is approximately equal to a diameter of the head portion 202 of the screw 200. Accordingly, the air discharged from the exhaust hole 12*e* does not directly hit the head portion 202 of the screw 200 located in the injection passage 12*a*. The exhaust hole 12*e* may be provided radially outside the injection passage 12*a*. With this configuration, regardless of variations in the type and position of the screw 200, the air discharged from the exhaust hole 12*e* is configured not to directly hit the head portion 202 of the screw 200 located in the injection passage 12*a*.

The exhaust hole 12*e* is not connected to the guide hole 12*d* at least on a lower end surface of the guide portion 12*c*. Further, the exhaust hole 12*e* is not connected to the guide hole 12*d* over an entire length of the guide portion 12*c* in the up-down direction. With this configuration, formation of an uneven surface on an inner peripheral surface of the guide hole 12*d*, which is caused by the guide hole 12*d* connected to the exhaust hole 12*e*, is prevented. The number of the exhaust holes 12*e* may be one or more. In a configuration in which a plurality of exhaust holes 12*e* are provided, the cross-sectional areas and cross-sectional shapes of the exhaust holes 12*e* may be the same or different. Further, the exhaust hole 12*e* may be circular or polygonal such as triangular or quadrangular. The exhaust hole 12*e* may have an arc shape along a circumferential direction of the guide hole 12*d*. As described above, the exhaust hole 12*e* is appropriately set according to the strength of the guide portion 12*c* or an exhaust flow rate from the exhaust hole 12*e*, and any shape and number may be adopted as long as the air pressure in the driving cylinder 30 is appropriately maintained and the guide of the driver by the guide hole 12*d* is not inhibited.

In this example, the nose 12 is a component different from the body 10. In the driving cylinder 30, when the nose 12 is attached to the body 10, a lower end of the first chamber 30*c* is closed by the guide portion 12*c*. The guide portion 12*c* may be integrated with the body 10 or may be integrated with the driving cylinder 30.

In the screw driving machine 1A, a wall portion 30*f* is provided between the driving cylinder 30 and the air motor 31, and an upper end of the second chamber 30*d* is closed by the wall portion 30*f*. The driving cylinder 30 includes a bumper 30*g* at the upper end of the second chamber 30*d*. The bumper 30*g* is formed of an elastic body and is attached to the wall portion 30*f*. The bumper 30*g* has an annular shape with which the driving piston 30*a* can come into contact. In the bumper 30*g*, the motor shaft 31*a* can pass through the opening in the central portion. The driving piston 30*a* is movable in the upward direction to a position in contact with the bumper 30*g*. In the driving piston 30*a* and the driver bit 2, a position where the driving piston 30*a* comes into contact with the bumper 30*g* is a top dead center position. The bumper 30*g* is elastically deformable, and the top dead center positions of the driving piston 30*a* and the driver bit 2 move within a range in which the bumper 30*g* is elastically deformable.

The air motor 31 includes a rotor 31*b*1 that rotates when the compressed air is supplied, a blade 31*b*2 that receives a flow of air for causing the rotor 31*b*1 to rotate, and a motor housing 31*c* that rotatably supports the rotor 31*b*1 and generates the flow of air for causing the rotor **31*b*1 to rotate. In the air motor 31, the motor shaft 31*a* is inserted into a hole 31*b*3 provided in the rotor 31*b*1. In the air motor 31, rotation of the rotor 31*b*1 is transmitted to the motor shaft 31*a* via a speed reducer 31*d*. The speed reducer 31*d* includes, for example, a planetary gear mechanism, and is provided between the driving cylinder 30 and the air motor 31**.

The motor shaft **31*a* is supported movably in the axial direction with respect to the speed reducer 31*d*. Accordingly, the motor shaft 31*a* moves in the up-down direction integrally with the driving piston 30*a* and the driver bit 2**.

When the rotor **31*b*1 of the air motor 31 rotates, the motor shaft 31*a* rotates at a predetermined reduction ratio via the speed reducer 31*d***.

The air motor 31 is provided on an upper side of the driving cylinder 30. The motor shaft **31*a* is provided coaxially with the driver bit 2. Accordingly, the air motor 31 is provided on the upper side of the body 10 coaxially with the driving cylinder 30. The air motor 31 is configured such that the motor shaft 31*a* is inserted into the hole portion 31*b*3 provided in the rotor 31*b*1, and thus a space in which the motor shaft 31*a*** moves in the up-down direction is secured.

In addition, the screw driving machine 1A includes a main valve 5 that switches whether the compressed air is to be supplied to the driving cylinder 30 and air motor 31, a start valve 6 that causes the main valve 5 to operate, and a trigger 60 that causes the start valve 6 to operate. Further, the screw driving machine 1A includes an on-off valve 7 that switches whether the compressed air is to be supplied to the air motor 31 and a controller 70 that causes the on-off valve 7 to operate.

Further, the screw driving machine 1A includes a contact 8 that enables the start valve 6 to operate in cooperation with the operation of the trigger 60 and causes the controller 70 to operate. In addition, the screw driving machine 1A includes a screw feeding portion 9 that feeds the screw 200 to the nose 12 and a magazine 90 that accommodates the screw 200 fed by the screw feeding portion 9.

The screw driving machine 1A includes a main chamber 13 to which compressed air is supplied from an external air compressor (not illustrated). The main chamber 13 is provided in the handle 11 and on an outer periphery of the driving cylinder 30 connected to an inside of the handle 11 in the body 10. Compressed air decompressed by a pressure reducing valve **13*a* is supplied to the main chamber 13. In addition, the screw driving machine 1A includes an exhaust pipe 14. The compressed air supplied to the driving cylinder 30, the air motor 31, and the like, is discharged from the exhaust pipe 14. The exhaust pipe 14 is provided in the handle portion 11. The compressed air is discharged from the exhaust pipe 14 via an exhaust filter 14*a***.

The screw driving machine 1A includes a timer chamber 32 and a blowback chamber 33. The timer chamber 32 is supplied with the compressed air for causing the controller 70 to operate. The blowback chamber 33 causes the driving piston **30*a* moved to the bottom dead center position to return to the top dead center position and is supplied with the compressed air for causing the screw feeding portion 9** to operate.

The timer chamber 32 and the blowback chamber 33 are provided on an outer peripheral side of the driving cylinder 30 inside the body 10. The timer chamber 32 is in communication with a space in the driving cylinder 30 via a side hole flow path **32*a* provided on a side surface of the driving cylinder 30. The side hole flow path 32*a* is provided below the vicinity of the center between a lower end and an upper end of the driving cylinder 30**.

The timer chamber 32 is connected to the first chamber **30*c* formed on the lower side of the driving piston 30*a* via the side hole flow path 32*a* until the driving piston 30*a* moves from the top dead center position to the position where the first seal portion 30*b*1 passes through the side hole flow path 32*a*, and the communication between the timer chamber 32 and the second chamber 30*d* formed on the upper side of the driving piston 30*a* is blocked by the second seal portion 30*b*2. In the timer chamber 32, when the driving piston 30*a* moves until the side hole flow path 32*a* is located between the first seal portion 30*b*1 and the second seal portion 30*b*2, the first chamber 30*c* and the side hole flow path 32*a* are blocked by the first seal portion 30*b*1, and the communication between the second chamber 30*d* and the side hole flow path 32*a* is blocked by the second seal portion 30*b*2. Further, when the driving piston 30*a* further moves in the downward direction and the second seal portion 30*b*2 passes through the side hole flow path 32*a*, the timer chamber 32 is connected to the second chamber 30*d* via the side hole flow path 32*a*. When the driving piston 30*a* is at the bottom dead center position, the timer chamber 32 is in a state of being connected to the second chamber 30*d* via the side hole flow path 32*a***.

In addition, the blowback chamber 33 is in communication with the space in the driving cylinder 30 via side hole flow paths **33*a* and 33*b* provided on a side surface of the driving cylinder 30. The side hole flow path 33*a* is provided in the vicinity of the lower end of the driving cylinder 30 above the bumper 30*e*. The side hole flow path 33*b* is provided above the vicinity of the center between the lower end and the upper end of the driving cylinder 30**.

The blowback chamber 33 is connected to the first chamber **30*c* via the side hole flow path 33*a* according to a position of the driving piston 30*a*. Further, the blowback chamber 33 is connected to the first chamber 30*c* or the second chamber 30*d* via the side hole flow path 33*b* according to the position of the driving piston 30*a***.

Accordingly, when the driving piston **30*a* moves between the top dead center position and the bottom dead center position, the compressed air is supplied from the driving cylinder 30 to the timer chamber 32 and the blowback chamber 33 according to the position of the driving piston 30*a***, and the pressure changes.

The contact portion 8 is supported movably in the up-down direction with respect to the body 10. A contact top 80 that abuts against the driven member 300 is attached to a lower end of the contact 8.

The main valve 5 is vertically movably provided on an outer peripheral side of the driving cylinder 30. In the screw driving machine 1A, a main valve upper chamber 52 is provided on an upper side of the main valve 5, and the main valve upper chamber 52 is connected to the start valve 6.

In the screw driving machine 1A, a main valve lower chamber 53 is provided on a lower side of the main valve 5, and the main valve lower chamber 53 is connected to the main chamber 13. Further, in the screw driving machine 1A, an air flow path 54 is provided between the driving cylinder 30 and the main valve 5. In the screw driving machine 1A, a supply port 34 is provided in a side surface on an upper end side of the driving cylinder 30. In the screw driving machine 1A, the air flow path 54 is connected to the driving cylinder 30 via the supply port 34. In the screw driving machine 1A, an air flow path 74 is provided between the air flow path 54 and the air motor 31, and the air flow path 54 is connected to the air motor 31 via the air flow path 74.

In the screw driving machine 1A, when the main valve 5 moves in the downward direction, the communication between the air flow path 54 and the main valve lower chamber 53 is blocked by the main valve 5. In the screw driving machine 1A, when the main valve 5 moves to a position where the communication between the air flow path 54 and the main valve lower chamber 53 is blocked, the air flow path 54 is connected to the exhaust pipe 14. In the screw driving machine 1A, when the main valve 5 moves in the upward direction, the air flow path 54 is connected to the main valve lower chamber 53 via the main valve 5.

In addition, the main valve 5 is biased by a main valve spring 51 in the downward direction, which is a direction in which an air flow path 54 is closed. The main valve spring 51 is provided in the main valve upper chamber 52.

In addition, in the main valve 5, the compressed air is supplied from the main chamber 13 to a main valve upper chamber 52 via the start valve 6, and the main valve 5 is pressed in the downward direction by the air pressure of the compressed air. In addition, in the main valve 5, the compressed air is supplied from the main chamber 13 to a main valve lower chamber 53, and the main valve 5 is pressed in the upward direction by the air pressure of the compressed air.

Accordingly, the main valve 5 opens and closes the air flow path 54 connecting the main chamber 13, the driving cylinder 30, and the air motor 31. When the main valve 5 is not in operation, the main valve 5 is biased in the downward direction to be located at the bottom dead center position based on a relation, the relation being of a force of the main valve spring 51 and a balance between the air pressure of the compressed air supplied to the main valve upper chamber 52 and a load generated by the air pressure of the compressed air supplied to the main valve lower chamber 53, thereby blocking the air flow path 54 between the main valve lower chamber 53 and the driving cylinder 30. On the other hand, when the main valve 5 is in operation, the main valve 5 is pressed in the upward direction by the air pressure of the compressed air supplied from the main chamber 13 to the main valve lower chamber 53 when the main valve upper chamber 52 communicates with the atmosphere via the start valve 6, thereby opening the air flow path 54 between the main valve lower chamber 53 and the driving cylinder 30.

The start valve 6 includes a pilot valve 61 that opens and closes the main valve upper chamber 52, a valve stem 62 that causes the pilot valve 61 to operate, and a valve stem spring 63 that biases the pilot valve 61 in the upward direction and biases the valve stem 62 in the downward direction.

In the start valve 6, the pilot valve 61 is pressed in the downward direction due to the air pressure of the compressed air supplied from the main chamber 13. In addition, in the start valve 6, the pilot valve 61 is pressed in the upward direction due to the air pressure of the compressed air supplied from the main chamber 13 to a valve lower chamber 64.

Accordingly, in the start valve 6, the pilot valve 61 is held at an upper position based on a relation between a balance of the air pressure of the compressed air and a force of the valve stem spring 63. In contrast, in the start valve 6, when the valve stem 62 moves in the upward direction, the valve lower chamber 64 communicates with the atmosphere, and thus the pilot valve 61 moves in the downward direction due to the air pressure of the compressed air. Further, when the pilot valve 61 moves in the downward direction, a passage through which the main valve upper chamber 52 communicates with the atmosphere is opened.

The trigger 60 is provided on the lower side of the handle portion 11 and rotates about 60*c* as a fulcrum in response to an operation of an operator. The trigger 60 is biased in the direction separating from the valve stem 62 of the start valve 6 by a trigger spring 60*d*.

The trigger 60 includes a contact lever 60*a* that causes the valve stem 62 of the start valve 6 to operate. The contact lever 60*a* is supported by the trigger 60 to be rotatable about a shaft 60*b* as a fulcrum.

In the start valve 6, in accordance with an operation of pressing the contact top 80 against the driven member 300, the contact lever 60*a* comes into contact with the valve stem 62 and the valve stem 62 moves in the upward direction by a combination of an operation of moving the contact 8 in the upward direction relative to the body 10 and an operation of pulling the trigger 60. The start valve 6 operates when the valve stem 62 moves in the upward direction.

On the other hand, in the start valve 6, in accordance with an operation of pressing the contact top 80 against the driven member 300, the contact lever 60*a* does not come into contact with the valve stem 62 only by an operation of moving the contact 8 in the upward direction relative to the body 10 or only by an operation of pulling the trigger 60.

Accordingly, the start valve 6 is operated by a combination of an operation of the trigger 60 and an operation of being pressed by the contact 8. An order of the operation of the trigger 60 and the operation of being pressed by the contact 8 is optional.

The on-off valve 7 is vertically movably supported by an on-off valve cylinder 73 provided on a side portion of the body 10. In the on-off valve cylinder 73, an on-off valve lower chamber 73*a* is provided on a lower side of the on-off valve 7, and an on-off valve upper chamber 73*b* is provided on an upper side of the on-off valve 7. When compressed air is supplied to the on-off valve upper chamber 73*b*, the on-off valve 7 moves in the downward direction by the pressure of the compressed air. When no compressed air is supplied to the on-off valve upper chamber 73*b*, the on-off valve 7 moves in the upward direction by the pressure of the compressed air supplied to the on-off valve lower chamber 73*a*.

The on-off valve 7 closes the air flow path 74 by moving in the downward direction, and blocks the flow of air between the main chamber 13 and the air motor 31. When the on-off valve 7 moves in the upward direction, the on-off valve 7 opens the air flow path 74 to establish communication between the main chamber 13 and the air motor 31.

The controller 70 includes a control valve cylinder 75 and a first control valve 72 accommodated in the control valve cylinder 75. The first control valve 72 is supported by the control valve cylinder 75 to be vertically movable, and partitions the inside of the control valve cylinder 75 into a third chamber 75*a* and a fourth chamber 75*b*. The controller 70 also includes a communication passage 75*c* that allows the third chamber 75*a* to communicate with the timer chamber 32. The communication passage 75*c* allows the driving cylinder 30 and the third chamber 75*a* to communicate with each other via the timer chamber 32. The controller 70 further includes a second control valve 71 provided above the first control valve 72.

The controller 70 includes a first biasing member 72*b* that biases the first control valve 72 in the downward direction and a second biasing member 71*a* that biases the second control valve 71 in the downward direction.

The third chamber 75*a* of the control valve cylinder 75 is in communication with the space in the driving cylinder 30 via the timer chamber 32. In addition, in the control valve cylinder 75, the third chamber 75*a* is in communication with an outside of a body of the screw driving machine 1A via an exhaust passage 75*d*.

The first control valve 72 moves to a standby position P100 by being biased in the downward direction by the first biasing member 72*b*. The first control valve 72 moves in the upward direction from the standby position P100 to the operation completion position via the pressure control start position.

The first control valve 72 includes a seal portion 72*c* that opens and closes the exhaust passage 75*d*. While the first control valve 72 is on standby at the standby position P100, the seal portion 72*c* moves to a position where the exhaust passage 75*d* is opened. When the seal portion 72*c* moves to the position where the exhaust passage 75*d* is opened, the third chamber 75*a* of the control valve cylinder 75 is in communication with the outside of the body of the screw driving machine 1A via the exhaust passage 75*d*.

The second control valve 71 is configured by a rod-shaped member extending in the up-down direction, and is vertically movably supported with respect to the on-off valve 7. The second control valve 71 moves to a standby position P110 by being biased in the arrow D direction by the second biasing member 71*a*. In addition, the second control valve 71 is operated by being pressed by the first control valve 72. The second control valve 71 moves from the standby position P110 to an operation completion position and is configured to cause the on-off valve 7 to operate by switching whether the compressed air is to be supplied to the on-off valve upper chamber 73*b* of the on-off valve cylinder 73.

In the controller 70, the first control valve 72 and the second control valve 71 are configured by independent members. In the controller 70, a separation portion 76 is formed separating the first control valve 72 moved to the standby position P100 and the second control valve 71 moved to the standby position P110. The separation portion 76 is configured by providing a space between an upper end of the coupling portion 72*a*, which is an upper end of the first control valve 72, and a lower end of the second control valve 71.

The screw feeding portion 9 is operated by the air pressure of the compressed air supplied from the blowback chamber 33 via the feed flow path 94, and feeds the screw 200 coupled by the coupling band 201 to the injection passage 12*a* by locking the screw 200 with a claw portion (not illustrated).

The magazine 90 is provided on the lower side of the handle 11 and is coupled to the nose 12. In the magazine 90, a plurality of screws 200 are coupled by the coupling band 201, and a screw coupling body in a form of, for example, a spiral shape is accommodated. The magazine 90 is provided so that a lid 91 can be opened and closed.

The screw driving machine 1A includes a tightening depth adjusting portion 86 that adjusts a tightening depth of the screw 200. The tightening depth adjusting portion 86 defines a top dead center position of the contact 8. The tightening depth adjusting portion 86 is pressed by the contact 8 to cause the first control valve 72 to operate.

The tightening depth adjusting portion 86 is supported movably in the up-down direction along the moving direction of the contact 8. The tightening depth adjusting portion 86 is biased in the downward direction by a biasing member 86*c* such as a coil spring. The tightening depth adjusting portion 86 is configured such that the entire length along the up-down direction can be adjusted by operating a dial portion 86*d*.

The contact 8 includes a contact portion 81 that comes into contact with the tightening depth adjusting portion 86. In the contact 8, a portion where the contact top 80 is attached and a portion where the contact portion 81 is provided are linked to be vertically movable in conjunction with each other.

When the contact 8 is at the bottom dead center position, the tightening depth adjusting portion 86 is separated from the contact portion 81. When the contact 8 moves in the upward direction from the bottom dead center position, the contact portion 81 comes into contact with tightening depth adjusting portion 86.

In a state before the tightening depth adjusting portion 86 is pressed by the contact 8 and moved, the tightening depth adjusting portion 86 and the first control valve 72 are separated from each other. When the contact 8 moves in the upward direction from the bottom dead center position, the contact portion 81 comes into contact with tightening depth adjusting portion 86. When the tightening depth adjusting portion 86 is pressed by the contact 8 and moves in the upward direction, the tightening depth adjusting portion 86 comes into contact with the first control valve 72.

When the tightening depth adjusting portion 86 is pressed up by the contact 8 moving in the upward direction and moves to a position in contact with a movement regulating portion 86*e*, the tightening depth adjusting portion 86 regulates the contact 8 from further moving in the upward direction.

Accordingly, a position of the contact 8 regulated by the movement of the tightening depth adjusting portion 86 to the position in contact with the movement regulating portion 86*e* becomes an upper fulcrum position of the contact 8.

As the overall length of the tightening depth adjusting portion 86 changes, a position where the contact portion 81 comes into contact moves in the up-down direction. Accordingly, the top dead center position of the contact 8 moves. When the top dead center position of the contact 8 moves, a distance between the body 10 and the driven member 300 changes at a timing when the rotation of the air motor 31 stops, and a tightening depth of the screw 200 with respect to the driven member 300 changes.

In the screw driving machine 1A, the tightening depth adjusting portion 86 may not be provided, the contact 8 may be in directly contact with the first control valve 72 to cause the first control valve 72 to operate, and the upper fulcrum position of the contact 8 may be defined.

Operation Example of Screw Driving Machine According to Present Embodiment

Next, an example of the operation of the screw driving machine 1A in which driving and tightening of the screw 200 are performed will be described.

The operator holds the handle 11 of the screw driving machine 1A and presses the contact top 80 against the driven member 300. In the screw driving machine 1A, when the contact top 80 is pressed against the driven member 300, the contact 8 moves in the upward direction with respect to the body 10 due to the relative movement between the contact 8 and the body 10.

When the contact 8 moves in the upward direction due to the relative movement with respect to the body 10, a sign-in state can be reached. In this state, when an operation of pulling the trigger 60 is performed, the contact lever 60*a* presses the valve stem 62 of the start valve 6, and the start valve 6 is brought into a sign-in state where the start valve 6 is operated.

When the start valve 6 is operated, the main valve 5 moves in the upward direction by the air pressure of the compressed air supplied from the main chamber 13 to the main valve lower chamber 53, and the main valve lower chamber 53 and the air flow path 54 are connected so that the compressed air can be supplied from the main chamber 13 to the air flow path 54.

Accordingly, in the driving cylinder 30, the compressed air is supplied from the main chamber 13 to the second chamber 30*d* via the air flow path 54. The driving piston 30*a* is pressed by an air pressure of the compressed air supplied to the second chamber 30*d* of the driving cylinder 30 and moves in the downward direction from the top dead center position to cause the driver bit 2 to move in the downward direction along the axial direction. The driver bit 2 and the motor shaft 31*a* move integrally with the driving piston 30*a*. The driver bit 2 that moves in the downward direction is guided by the injection passage 12*a* of the nose 12, thereby driving the screw 200 supplied from the magazine 90 to the injection passage 12*a* into the driven member 300.

When the driving piston 30*a* moves in the downward direction from the top dead center position and the second seal portion 30*b*2 passes through the side hole flow path 33*b* of the driving cylinder 30, the compressed air is supplied from the second chamber 30*d* to the blowback chamber 33 via the side hole flow path 33*b*, and the pressure in the blowback chamber 33 increases.

When the main valve 5 is operated, compressed air is supplied from the main chamber 13 to the on-off valve lower chamber 73*a* of the on-off valve cylinder 73, which is a space on the lower side of the on-off valve 7, via the air flow path 54. When the compressed air is supplied to the on-off valve lower chamber 73*a*, the on-off valve 7 is operated by the air pressure to move in the upward direction, and the air flow path 54 and the air flow path 74 are connected with each other. Accordingly, the compressed air is supplied to the air motor 31.

When the compressed air is supplied to the air motor 31, the driver bit 2 rotates, and the screw 200 driven into the driven member 300 is tightened.

In the controller 70, in a state where the contact 8 moves to the bottom dead center position, the tightening depth adjusting portion 86 does not come into contact with the first control valve 72. In a state where the tightening depth adjusting portion 86 is not in contact with the first control valve 72, the first control valve 72 is biased by the first biasing member 72*b* and moves to the standby position P100, and the second control valve 71 is biased by the second biasing member 71*a* and moves to the standby position P110.

When the body 10 further moves in the downward direction following the tightening of the screw 200, and the contact 8 moves relatively in the upward direction by the operation of pressing the contact top 80 against the driven member 300, the contact portion 81 comes into contact with the tightening depth adjusting portion 86 and presses the tightening depth adjusting portion 86 in the upward direction.

When the tightening depth adjusting portion 86 is pressed up by the contact 8 moving in the upward direction and the tightening depth adjusting portion 86 moves to a position in contact with the movement regulating portion 86*e*, the contact 8 is regulated from further moving in the upward direction. When the tightening depth adjusting portion 86 moves to a position in contact with the movement regulating portion 86*e* and the contact 8 moves to the top dead center position, the contact 8 presses the first control valve 72 in the upward direction via the tightening depth adjusting portion 86, and the first control valve 72 moves from the standby position P100 to the pressure control start position.

In the control valve cylinder 75, the third chamber 75*a* is normally in communication with the space in the driving cylinder 30 via the communication passage 75*c* and the side hole flow path 32*a* of the driving cylinder 30. When the main valve 5 is operated, the driving piston 30*a* moves in the downward direction by a predetermined distance, and the second seal portion 30*b*2 passes through the side hole flow path 32*a*, the second chamber 30*d* in the driving cylinder 30 and the third chamber 75*a* of the control valve cylinder 75 are in communication with each other. Accordingly, the compressed air is supplied from the second chamber 30*d* to the timer chamber 32. During a period in which the first control valve 72 moves to the pressure control start position from a state where the first control valve 72 stands by at the standby position P100, the seal portion 72*c* of the first control valve 72 is at a position where the exhaust passage 75*d* is opened, and the third chamber 75*a* of the control valve cylinder 75 is in communication with the outside of the body of the screw driving machine 1A via the exhaust passage 75*d*. Accordingly, until the first control valve 72 moves to the pressure control start position, even when the compressed air is supplied from the timer chamber 32 to the third chamber 75*a* of the control valve cylinder 75, the third chamber 75*a* is maintained at atmospheric pressure, and the first control valve 72 does not operate with the air pressure.

When the first control valve 72 moves to the pressure control start position, the seal portion 72*c* of the first control valve 72 closes the exhaust passage 75*d*. When the air flow path to an outside of a gas passing through the exhaust passage 75*d* is blocked, pressure in the control valve cylinder 75 increases due to the air pressure of the compressed air supplied from the timer chamber 32 to the third chamber 75*a* of the control valve cylinder 75. When the pressure in the control valve cylinder 75 increases, the first control valve 72 is operated due to the air pressure, and the first control valve 72 further moves in the upward direction.

When the first control valve 72 further moves in the upward direction from the pressure control start position due to the air pressure of the compressed air and the first control valve 72 moves to the second control valve operation start position, the first control valve 72 comes into contact with the second control valve 71, and the first control valve 72 presses the second control valve 71 in the upward direction. When the second control valve 71 moves to the operation completion position by movement of the first control valve 72 to the operation completion position, the compressed air is supplied to the on-off valve upper chamber 73*b* of the on-off valve cylinder 73 which is a space on the upper side of the on-off valve 7.

When the compressed air is supplied to the on-off valve upper chamber 73*b*, the on-off valve 7 moves in the downward direction due to a difference between pressure acting on the on-off valve 7 due to the compressed air supplied to the on-off valve upper chamber 73*b* and a load acting on the on-off valve 7 due to the compressed air supplied to the on-off valve lower chamber 73*a*, and supply of the compressed air to the air motor 31 is stopped. When the supply of the compressed air to the air motor 31 is stopped, rotation of the driver bit 2 is stopped.

When the rotation of the driver bit 2 is stopped and the tightening of the screw 200 is completed, the operator weakens the force for pressing the contact top 80 against the driven member 300 and moves the body 10 in a direction away from the driven member 300.

When the body 10 moves in the direction away from the driven member 300, the contact 8 moves in the downward direction due to the relative movement of the body 10 and the contact 8. When the contact 8 moves in the downward direction, the pressing of the contact lever 60*a* is released, and the contact lever 60*a* is away from the start valve 6. When the contact lever 60*a* is away from the start valve 6, the main valve 5 is closed, the second chamber 30*d* of the driving cylinder 30 is in communication with the atmosphere via the air flow path 54 and the exhaust pipe 14, and the pressure in the second chamber 30*d* decreases.

When the pressure in the second chamber 30*d* of the driving cylinder 30 decreases to the atmospheric pressure, the driving piston 30*a* moves to the top dead center position by the air pressure in the blowback chamber 33.

As described above, a screw driving machine is a driving tool in which a driving cylinder is operated using compressed air as a power source, a screw is driven into a driven member by moving a driver in an axial direction, an air motor is operated using the compressed air as a power source, and the screw is tightened into the driven member by rotating the driver.

In such a screw driving machine, an automatic stop control mechanism is known in the related art in which, when a screw is tightened by an air motor and the screw is screwed in a predetermined manner, the air motor is automatically stopped to control a depth of the screwing to be constant.

The automatic stop control mechanism of the air motor includes a controller including a valve operated by compressed air supplied via a driving cylinder, and a flow path through which the compressed air supplied to the controller passes via the driving cylinder. An opening connected to the flow path is formed at a predetermined position of the driving cylinder. The automatic stop control mechanism of the air motor is configured to operate a valve when a position of the contact pressed against a driven member and a position of a driving piston reach respective specified positions.

In the related art, in a screw driving machine, a depth into which a screw is driven is substantially constant regardless of a length of a screw to be used. Therefore, a position of the driving piston immediately after the screw is driven into the driven member may vary depending on the length of the screw.

However, depending on the position of the driving piston immediately after the screw is driven into the driven member, the balance of the air pressure in the driving cylinder may be changed, and before the position of the driving piston reaches a specified position, the air pressure in a driving cylinder lower chamber may increase, and the air motor may stop.

If the air in the driving cylinder lower chamber is not appropriately exhausted when the driving piston moves in the downward direction, the air pressure in the driving cylinder lower chamber increases, a load generated when the driving piston moves in the downward direction increases, and a speed at which the driving piston moves in the downward direction decreases.

Further, when the driving piston returns to a top dead center position by the air pressure of the compressed air supplied from a blowback chamber to the driving cylinder lower chamber, if the air in the driving cylinder lower chamber is not appropriately discharged, the air pressure in the blowback chamber and the driving cylinder lower chamber may be excessively increased with respect to the air pressure in the driving cylinder upper chamber. In this case, a speed at which the driving piston moves in the upward direction becomes too high, and the driving piston colliding with a damper provided on an upper side of the driving cylinder may bounce, and the driving piston may not be able to return to the top dead center position.

A diameter of a guide hole through which the driver passes may be increased so that the air in the driving cylinder lower chamber can be discharged to the outside through a gap between an outer periphery of the driver and an inner periphery of the guide hole. However, in a configuration in which the exhaust hole is formed between an outer periphery of the driver and an inner periphery of the guide hole, since an interval between the driver and the guide hole is widened, when the driver is guided by the guide hole, the inclination of the driver cannot be reduced, and the guide performance of the driver by the guide hole is lowered.

Further, it is also conceivable to form a portion protruding outward in a part of the inner peripheral surface of the guide hole to provide an exhaust hole in a form connected to the guide hole so that the air in the driving cylinder lower chamber can be exhausted to the outside. However, when the exhaust hole is provided to be connected to the guide hole, the uneven surface is formed on the inner peripheral surface of the guide hole. However, when the uneven surface is formed on the inner peripheral surface of the guide hole, the inclination of the driver cannot be reduced when the driver is guided by the guide hole, and the guide performance of the driver by the guide hole is lowered.

Therefore, in order to realize an appropriate air sequence in the screw driving machine, it is necessary to appropriately maintain the air pressure in the driving cylinder. Further, it is also required to ensure the guide performance of the driver. Details will be described below.

Figure 4A:
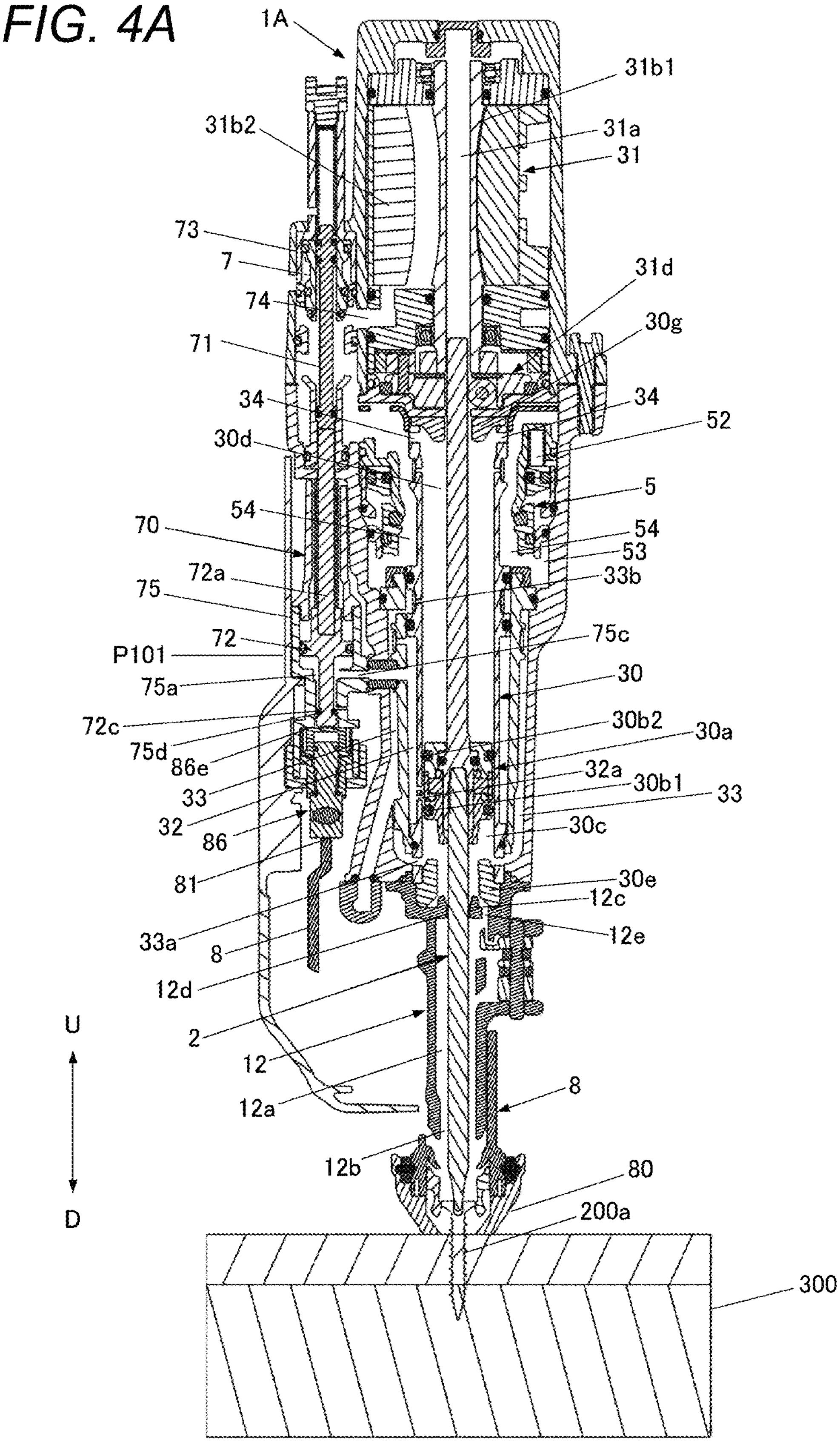
FIG. 4A is a front sectional view illustrating an operation example of the screw driving machine according to a length of a screw.
Figure 4B:
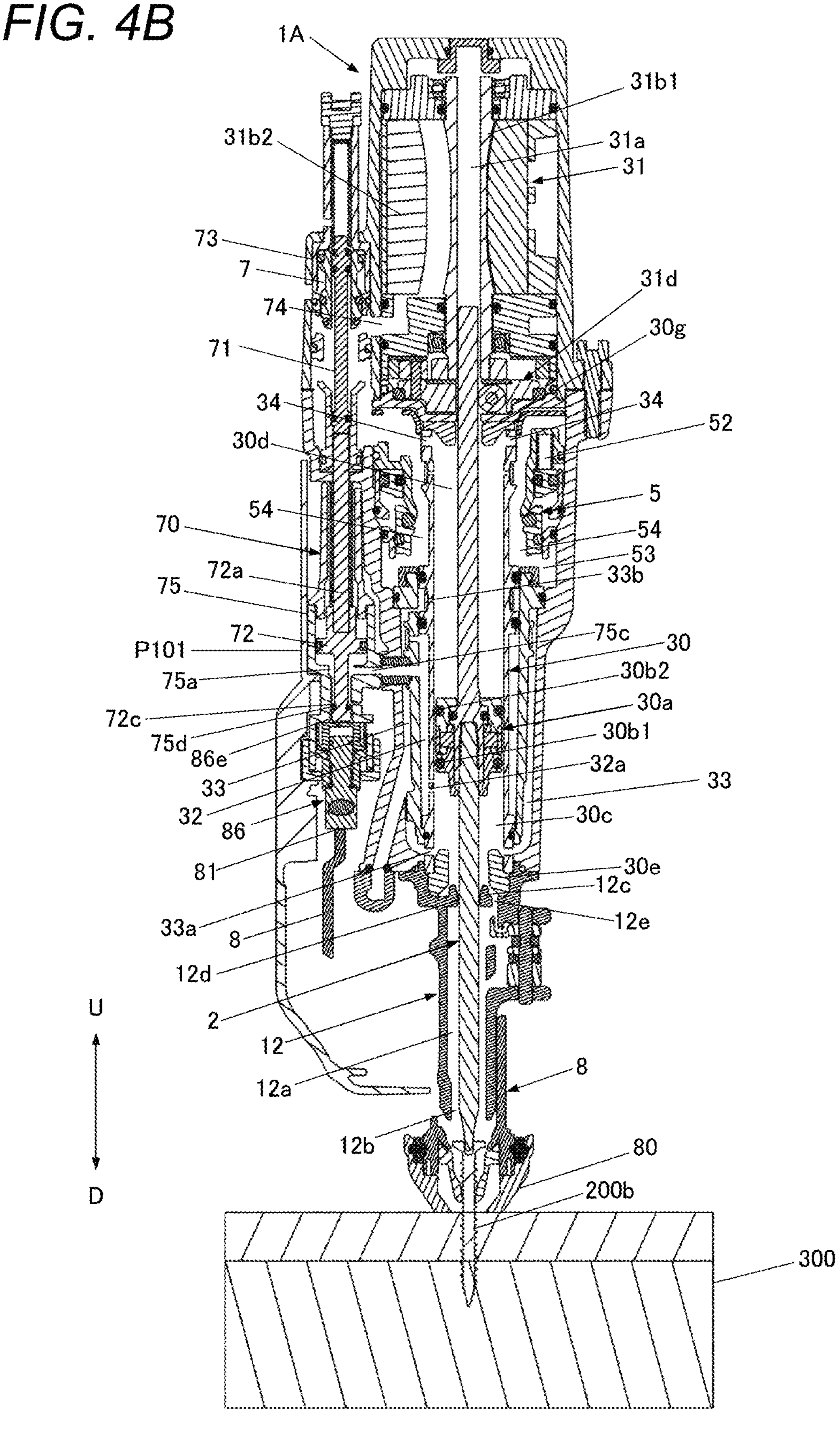
FIG. 4B is a front sectional view illustrating an operation example of the screw driving machine according to the length of the screw.

FIGS. 4A and 4B are front sectional views illustrating an operation example of the screw driving machine according to a length of a screw. FIG. 4A illustrates a state immediately after the screw 200*a* having a first length L1 is driven into the driven member 300, and FIG. 4B illustrates a state immediately after the screw 200*a* having a second length L2 longer than the first length L1 is driven into the driven member 300.

As described above, when the contact 8 moves to the top dead center position, the contact 8 presses the first control valve 72 in the upward direction via the tightening depth adjusting portion 86, and the first control valve 72 moves from the standby position P100 to a pressure control start position P101.

The driving piston 30*a* immediately after the screw 200*a* having the first length L1 is driven into the driven member 300 is located such that the side hole flow path 32*a* is interposed between the first seal portion 30*b*1 and the second seal portion 30*b*2. When the driving piston 30*a* moves to the bottom dead center position, the second seal portion 30*b*2 passes through the side hole flow path 32*a*.

Accordingly, even when the first control valve 72 moves to the pressure control start position P101 and the air flow path to the outside of the gas passing through the exhaust passage 75*d* is blocked, the pressure in the timer chamber 32 does not increase until the driving piston 30*a* moves to the bottom dead center position. Therefore, the pressure in the control valve cylinder 75 does not increase, and the first control valve 72 is prevented from moving further in the upward direction from the pressure control start position P101.

Therefore, the compressed air continues to be supplied to the air motor 31 until the driving piston 30*a* moves to the bottom dead center position, and the screw 200*a* is tightened into the driven member 300.

On the other hand, a driving depth of the screw 200*b* having the second length L2 driven into the driven member 300 is about the same as that of the screw 200*a* having the first length L1. Therefore, the driving piston 30*a* immediately after the screw 200*b* having the second length L2 is driven into the driven member 300 does not pass through the side hole flow path 32*a*, and the first seal portion 30*b*1 is located on an upper side of the side hole flow path 32*a*.

Further, the driving piston 30*a* immediately after the screw 200*b* having the second length L2 is driven into the driven member 300 passes through the side hole flow path 33*b*, and the second seal portion 30*b*2 is located on a lower side of the side hole flow path 33*b*.

Accordingly, the compressed air is supplied from the second chamber 30*d* to the blowback chamber 33 via the side hole flow path 33*b*. When the air in the first chamber 30*c* cannot be appropriately discharged to the outside, the compressed air in the blowback chamber 33 flows into the timer chamber 32 via the side hole flow path 33*a*, the first chamber 30*c*, and the side hole flow path 32*a*, and the pressure in the timer chamber 32 increases.

When the pressure in the timer chamber 32 increases in a state where the first control valve 72 moves to the pressure control start position P101 and the air flow path to the outside of the gas passing through the exhaust passage 75*d* is blocked, the pressure in the control valve cylinder 75 may increase, and the first control valve 72 may move further in the upward direction from the pressure control start position P101. Accordingly, there is a possibility that the supply of the compressed air to the air motor 31 is stopped before the head portion 202 of the screw 200*b* is tightened until the head portion 202 is in a state of being flush with the driven member 300.

Therefore, the screw driving machine 1A includes the exhaust hole 12*e* in the guide portion 12*c*. The exhaust hole 12*e* allows the first chamber 30*c* to communicate with the outside of the screw driving machine 1A. Accordingly, the air in the first chamber 30*c* can be appropriately discharged to the outside of the screw driving machine 1A. Therefore, even when the compressed air is supplied from the second chamber 30*d* to the blowback chamber 33 via the side hole flow path 33*b* and is further supplied from the blowback chamber 33 to the first chamber 30*c* via the side hole flow path 33*a*, the air in the first chamber 30*c* is discharged to the outside, and the pressure in the timer chamber 32 does not increase. Accordingly, the pressure in the control valve cylinder 75 does not increase, and the first control valve 72 is prevented from moving further in the upward direction from the pressure control start position P101.

Therefore, the compressed air continues to be supplied to the air motor 31 until the driving piston 30*a* moves to the bottom dead center position, and the screw 200*b* is tightened into the driven member 300. In a state where the driving piston 30*a* moves to the bottom dead center position, a space inside the side hole flow path 33*a* and the bumper 30*e* is sealed by a lower surface of the driving piston 30*a* and an upper surface of the bumper 30*e*. Therefore, the compressed air in the blowback chamber 33 is prevented from flowing into the space inside the bumper 30*e* from the side hole flow path 33*a*, and the air in the blowback chamber 33 does not flow out to the outside from the exhaust hole 12*e*.

The exhaust hole 12*e* is provided radially outside the screw 200 with respect to the injection passage 12*a*. Accordingly, the air discharged from the exhaust hole 12*e* is prevented from directly hitting the head portion 202 of the screw 200 located in the injection passage 12*a* or the like. As a result, the screw 200 located in the injection passage 12*a* is prevented from coming off the coupling band 201 and falling off.

Further, the guide hole 12*d* is not connected to the exhaust hole 12*e* at least on a lower end surface of the guide portion 12*c*, and formation of an uneven surface on an inner peripheral surface of the guide hole 12*d* due to the exhaust hole 12*e* is prevented. Further, the exhaust hole 12*e* is not connected to the guide hole 12*d* over an entire length of the guide portion 12*c* in the up-down direction. Accordingly, the exhaust hole 12*e* does not hinder the guide of the movement in the up-down direction and the guide of the rotation of the driver bit 2 by the guide hole 12*d*. In addition, when the driver bit 2 is guided by the guide hole 12*d*, the inclination of the driver bit 2 is kept small, and the guide performance of the driver bit 2 by the guide hole 12*d* is secured.

In the above embodiment, the screw driving machine 1A is described as an example of a driving tool, but the present invention may be applied to a nail driving machine. The nail driving machine is a driving tool for driving a nail into a driven member by causing a driving cylinder to operate using compressed air as a power source and moving a driver in an axial direction.

In the nail driving machine, when the compressed air is supplied to the driving cylinder, the air pressure of the compressed air is applied to an upper surface of the driving piston, so that the driving piston is moved in the downward direction. Accordingly, in the nail driving machine, the driving piston moves the driver in the downward direction by the air pressure of the compressed air supplied to the driving cylinder, and the fastener is driven into the driven member.

At this time, the air in the driving cylinder lower chamber formed on the lower side of the driving piston is discharged to the outside through a gap between the driver and the guide hole through which the driver passes. However, even in the case of the nail driving machine, if the air in the driving cylinder lower chamber is not appropriately discharged, the air pressure in the driving cylinder lower chamber increases, a load generated when the driving piston moves in the downward direction increases, and a speed at which the driving piston moves in the downward direction decreases.

Further, when the driving piston returns to a top dead center position by the air pressure of the compressed air supplied from a blowback chamber to the driving cylinder lower chamber, if the air in the driving cylinder lower chamber is not appropriately discharged, the air pressure in the blowback chamber and the driving cylinder lower chamber may increase. In this case, even in the case of the nail driving machine, a speed at which the driving piston moves in the upward direction becomes too high, and the driving piston colliding with a damper provided on an upper side of the driving cylinder may bounce, and the driving piston may not be able to return to the top dead center position.

Therefore, in the case of the nail driving machine, an exhaust hole is also provided in a guide portion having a guide hole for guiding the driver. The exhaust hole allows the driving cylinder lower chamber to communicate with the outside of the nail driving machine. Accordingly, the air in the driving cylinder lower chamber can be appropriately discharged to the outside of the nail driving machine. Therefore, in an operation of driving a nail, a decrease in speed when the driving piston moves in the downward direction is prevented. In addition, when the driving piston returns to the top dead center position, a speed at which the driving piston moves in the upward direction can be set to an appropriate speed.

In addition, even in the case of the nail driving machine, the air in the driving cylinder lower chamber can be discharged to the outside by providing the exhaust hole in a form connected to the guide hole. However, when the exhaust hole is provided to be connected to the guide hole, the uneven surface is formed on the inner peripheral surface of the guide hole. However, when the uneven surface is formed on the inner peripheral surface of the guide hole, the inclination of the driver cannot be reduced when the driver is guided by the guide hole, and the guide performance of the driver by the guide hole is lowered.

Further, a configuration is also conceivable in which a diameter of the guide hole is increased, and an interval between an outer periphery of the driver and an inner periphery of the guide hole is used as the exhaust hole. However, in such a configuration, since an interval between the driver and the guide hole is widened, when the driver is guided by the guide hole, the inclination of the driver cannot be reduced, and the guide performance of the driver by the guide hole is lowered.

On the other hand, in the case of the nail driving machine, by providing the exhaust hole outside the guide hole through which the driver passes, the exhaust hole is not connected to the guide hole, and formation of the uneven surface on the inner peripheral surface of the guide hole is also prevented. Accordingly, the exhaust hole does not hinder the guide of the movement in the up-down direction and the guide of the rotation of the driver. In addition, when the driver is guided by the guide hole, the inclination of the driver is kept small, and the guide performance of the driver by the guide hole is secured.

Configuration Example for Assisting Driver Replacement

Figure 5A:
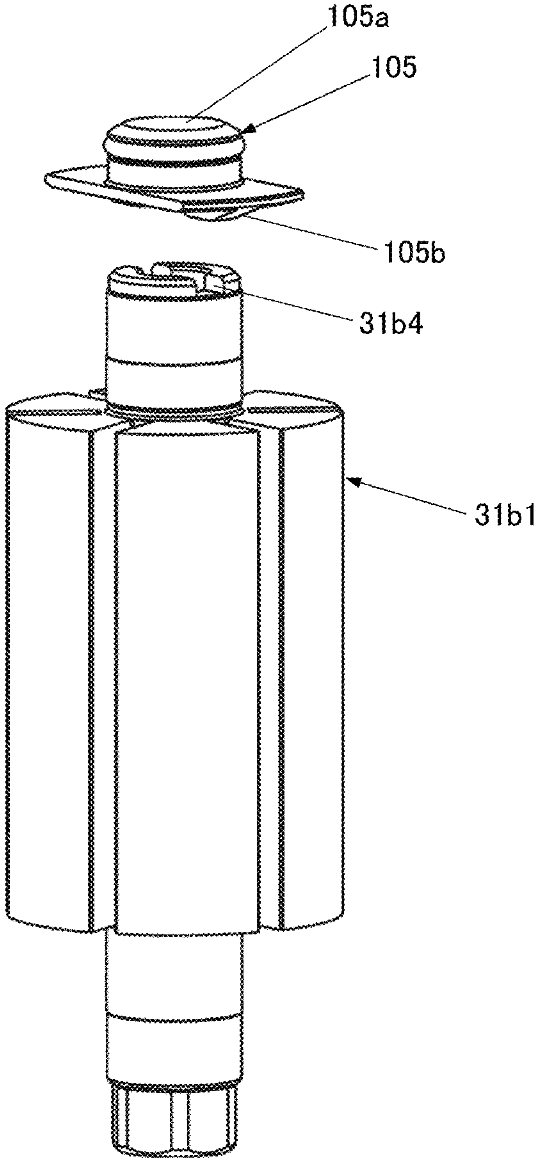
FIG. 5A is a side sectional view illustrating a configuration of main parts of the screw driving machine according to the present embodiment.
Figure 5B:
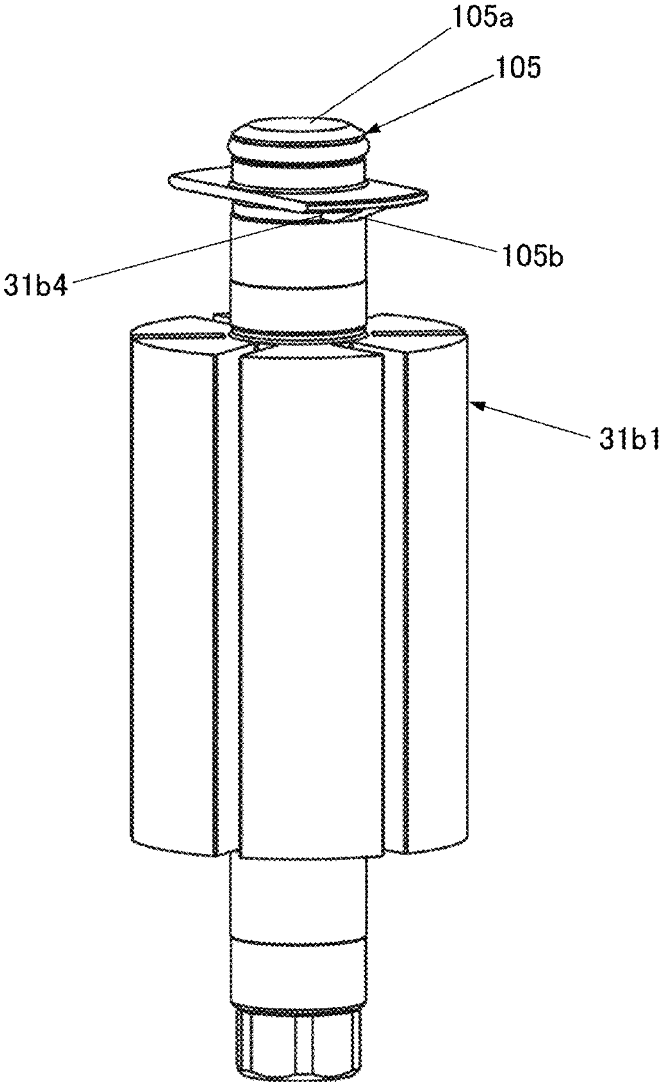
FIG. 5B is a side sectional view illustrating a configuration of main parts of the screw driving machine according to the present embodiment.
Figure 6:
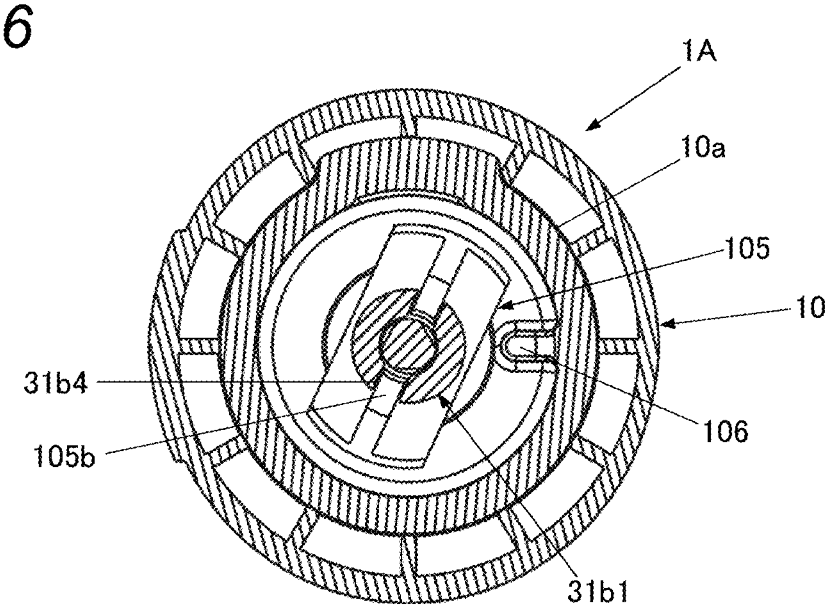
FIG. 6 is a plan sectional view illustrating a configuration of main parts of the screw driving machine according to the present embodiment.

FIGS. 5A and 5B are side sectional views illustrating a configuration of main parts of the screw driving machine according to the present embodiment related to a configuration for assisting driver replacement, and FIG. 6 is a plan sectional view illustrating a configuration of main parts of the screw driving machine according to the present embodiment.

The screw driving machine 1A includes a rotation regulating portion 105 that regulates rotation of the rotor **31*b*1 as an example of a rotating member and releases the regulation, and a rotation stopping portion 106 that regulates rotation of the rotation regulating portion 105. The rotation regulating portion 105 includes an operation portion 105*a* operable from the outside of the body 10 and a rotation regulating member 105*b* engaged with the rotor 31*b*1**.

The body 10 is provided with a cover portion **10*a* that covers the air motor 31. In the body 10, the rotation regulating portion 105 is attached to an upper surface of the cover portion 10*a*. The rotation regulating portion 105 is attached to the cover portion 10*a* to be movable in the up-down direction. An upper surface of the operation portion 105*a* of the rotation regulating portion 105 is exposed to the upper surface of the cover portion 10*a***.

The rotation regulating member **105*b* is configured by providing a convex portion protruding downward at a lower end of the rotation regulating portion 105**.

The rotation stopping portion 106 is configured by providing a convex portion in contact with the rotation regulating portion 105 on an inner surface of the cover portion **10*a***.

The rotor **31*b*1 includes an engaged portion 31*b*4 with which the rotation regulating member 105*b* is engaged. The engaged portion 31*b*4 is configured by providing, at an upper end of the rotor 31*b*1, a groove with which the rotation regulating member 105*b*** is engaged.

When the compressed air is supplied to the air motor 31, the rotation regulating portion 105 is pressed in the upward direction by the air pressure of the compressed air flowing into the cover portion **10*a* from the air motor 31 and moves to the standby position. In the standby position, as illustrated in FIG. 5A, the rotation regulating member 105*b* of the rotation regulating portion 105 is separated from and does not engage with the engaged portion 31*b*4. Accordingly, the regulation of the rotation of the rotor 31*b*1 by the rotation regulating portion 105 is released, and the rotor 31*b*1** is rotatable.

When the driver bit 2 is replaced, the rotation regulating portion 105 is caused to move in the downward direction by pressing the operation portion **105*a* in the downward direction while the compressed air is not supplied to the air motor 31 or the like. When the rotation regulating portion 105 moves in the downward direction, the rotation regulating member 105*b* engages with the engaged portion 31*b*4 as illustrated in FIG. 5**B.

The rotation regulating portion 105 is not rotatable with respect to the body 10 by being in contact with the rotation stopping portion 106. Accordingly, when the rotation regulating member **105*b* engages with the engaged portion 31*b*4, the rotation of the rotor 31*b*1 is regulated. By regulating the rotation of the rotor 31*b*1, the rotation of the motor shaft 31*a* connected to the rotor 31*b*1** is regulated.

The driver bit 2 is fixed to the motor shaft **31*a* by fastening a male screw (not illustrated) to a female screw (not illustrated) formed on the motor shaft 31*a***.

Therefore, the driver bit 2 can be removed from the motor shaft **31*a* by inserting a tool (not illustrated) from the injection passage 12*a*, engaging a tool (not illustrated) with the driver bit 2 exposed to the guide hole 12*d*, and rotating the driver bit 2** in a direction in which a screw is loosened.

When the driving piston **30*a* is at the top dead center position, a lower end of the driver bit 2 enters the guide hole 12*d*. Accordingly, when the driver bit 2 is removed, the driver bit 2 is guided by the guide hole 12*d* and can be taken out to the outside without remaining inside the driving cylinder 30**.

After the driver bit 2 to be replaced is taken out to the outside, a new driver bit 2 is inserted into the driving cylinder 30 through the guide hole **12*d*, and the driver bit 2 is rotated in a direction in which a screw is tightened by a tool (not illustrated), whereby the new driver bit 2 can be attached to the motor shaft 31*a*. When the rotation regulating member 105*b* engages with the engaged portion 31*b*4 by an operation of pressing the rotation regulating portion 105 in the downward direction, the rotation of the rotor 31*b*1 and the motor shaft 31*a* can be regulated without using a tool that presses the rotation regulating portion 105. The rotation regulating portion 105 is pressed in the upward direction by the air pressure of the compressed air flowing into the cover portion 10*a* from the air motor 31 and moves to the standby position. Accordingly, there is no need to use a tool or an operation for returning the rotation regulating portion 105** to the standby position.

Further, in the screw driving machine 1A, since the exhaust hole 12*e* is not connected to the guide hole 12*d*, the formation of the uneven surface on the inner peripheral surface of the guide hole 12*d* is prevented. Accordingly, when the driver bit 2 removed from the motor shaft 31*a* is guided by the guide hole 12*d* alone, the inclination of the driver bit 2 is kept small, and the guide performance of the driver bit 2 by the guide hole 12*d* is secured. Even if the driver bit 2 removed from the motor shaft 31*a* is inclined, the driver bit 2 is guided by the guide hole 12*d*, so that the driver bit 2 is not brought into contact with the inside of the driving cylinder 30. Further, when the new driver bit 2 is inserted into the driving cylinder 30 through the guide hole 12*d*, a position of the male screw (not illustrated) of the driver bit 2 is easily aligned with the female screw (not illustrated) formed on the motor shaft 31*a* by the guide of the driver bit 2 by the guide hole 12*d*.

What is claimed is:

1. A driving tool driven by air pressure of compressed air, the driving tool comprising:
- a driving cylinder to which compressed air is supplied;
- a driving piston configured to move in an up-down direction inside the driving cylinder by the supplied compressed air;
- a driver attached to the driving piston and configured to move in the up-down direction; and
- a guide portion provided on a lower side of the driving cylinder, wherein
- the guide portion has a guide hole through which the driver passes and an exhaust hole that allows an inside of the driving cylinder to communicate with an outside of the driving tool, and
- the exhaust hole is provided at a position separated outward from an inner peripheral surface of the guide hole.

2. The driving tool according to claim 1, further comprising
- an injection passage formation portion having an injection passage to which a fastener is supplied, wherein
- the injection passage formation portion is provided below the guide portion, and
- the exhaust hole is provided radially outside the fastener supplied to the injection passage with respect to a supply position of the fastener.

3. The driving tool according to claim 1, further comprising
- an injection passage formation portion having an injection passage to which a fastener is supplied, wherein
- the injection passage formation portion is provided below the guide portion, and
- the exhaust hole is provided radially outside the injection passage.

4. The driving tool according to claim 2, wherein
- the guide portion includes a plurality of exhaust holes including the exhaust hole.

5. The driving tool according to claim 1, wherein
- the driving cylinder includes a first chamber formed on a lower side of the driving piston, and
- the guide portion is provided on a lower side of the first chamber, and the first chamber and the outside of the driving tool are communicated with each other.

6. The driving tool according to claim 1, further comprising:
- a rotating member configured to rotatably support the driver around an axis of the driver; and
- a rotation regulating portion configured to regulate rotation of the rotating member and release regulating the rotation.

7. The driving tool according to claim 1, wherein
- the exhaust hole is provided at a position separated outward from the inner peripheral surface of the guide hole provided at least on a lower end surface of the guide portion.

8. The driving tool according to claim 7, wherein
- the exhaust hole is not connected to the guide hole over an entire length of the guide portion in the up-down direction.

* * * * *